United States Patent
Kung

(10) Patent No.: US 6,412,044 B1
(45) Date of Patent: Jun. 25, 2002

(54) CACHE MEMORY SYSTEM WITH DUAL CACHE TAG MEMORIES

(75) Inventor: Shao-Tsu Kung, Taipei (TW)

(73) Assignee: Compal Electronics, Inc., NeihuCounty (TW)

( * ) Notice: Subject to any disclaimer, the term of this patent is extended or adjusted under 35 U.S.C. 154(b) by 0 days.

(21) Appl. No.: 09/457,078

(22) Filed: Dec. 9, 1999

(51) Int. Cl.$^7$ ............................................... G06F 12/08
(52) U.S. Cl. ...................... 711/133; 711/118
(58) Field of Search .................. 711/118, 133

(56) References Cited

U.S. PATENT DOCUMENTS

| | | | |
|---|---|---|---|
| 5,551,000 A | * 8/1996 | Tan et al. | 711/118 |
| 5,675,765 A | * 10/1997 | Malamy et al. | 711/128 |
| 6,253,301 B1 | * 6/2001 | Razdan et al. | 711/202 |

* cited by examiner

Primary Examiner—Reginald G. Bragdon
(74) Attorney, Agent, or Firm—Winston Hsu

(57) ABSTRACT

A cache memory system of a computer. The computer comprises a processor, an address bus for transmitting a data address which can access one storage cell in the main memory, and a data bus for transmitting data. The data address contained in the address bus comprises a low-order portion defined as a cache line address and a high-order portion defined as a block address. The cache memory system comprises a cache data memory having a plurality of cache lines for storing data, a first cache tag memory having a plurality of tag cells for storing block addresses of data stored in the corresponding cache lines of the cache data memory, a second cache tag memory having a plurality of tag cells for storing block addresses of the cache lines of the cache data memory currently transmitted from the address bus. When the processor accesses the cache memory system, if the block address of the data address has cache misses with both the first and second block addresses, the second block address will be replaced with the block address of the data address. If the block address of the data address has a cache miss with the first block address but has a cache hit with the second block address, the data stored in the corresponding cache line of the cache data memory will be replaced.

3 Claims, 3 Drawing Sheets

| | I | II | III | IV | V | VI | VII | VIII | IX |
|---|---|---|---|---|---|---|---|---|---|
| Block address of data being accessed | | B0 | B1 | B1 | B0 | B1 | B2 | B3 | B3 |
| First block address (71) | B0 | B0 | B0 | B1 | B1 | B1 | B1 | B1 | B3 |
| Second block address (73) | B0 | B0 | B1 | B1 | B0 | B1 | B2 | B3 | B3 |
| Replaced block address | | N/A | 2nd | 1st | 2nd | 2nd | 2nd | 2nd | 1st |
| Swap procedure | | N | N | Y | N | N | N | N | Y |

Fig. 3

CACHE MEMORY SYSTEM WITH DUAL CACHE TAG MEMORIES

BACKGROUND OF THE INVENTION

1. Field of the Invention

The invention relates to a cache memory system of a computer, and more particularly, to a cache memory system with dual cache tag memories.

2. Description of the Prior Art

Please refer to FIG. 1. FIG. 1 is a functional block diagram of a prior art cache memory system 12 of a computer 10. The computer 10 comprises a processor 14, a first address bus 16 electrically connected between the processor 14 and the main memory 18 for transmitting a data address 22 which can access one storage cell 20 in the main memory 18, a first data bus 24 electrically connected between the processor 14 and the main memory 18 for transmitting data, a second address bus 28 electrically connected between the processor 14 and the cache data memory 26 for transmitting the data address 22, and a second data bus 30 electrically connected between the processor 14 and the cache data memory 26 for transmitting data. The data address 22 contained in the first and second address buses 16, 28 comprises a low-order portion defined as a cache line address and a high-order portion defined as a block address.

The cache memory system 12 comprises a cache data memory 26, a cache tag memory 34, and a cache controller 36 for controlling operations of the cache memory system 12. The cache data memory 26 is electrically connected between the second address bus 28 and the second data bus 30, and has a plurality of cache lines 32 for storing data from the main memory 18. Data stored in each cache line 32 of the cache data memory 26 is accessible by the processor 14 using the cache line address contained in the second address bus 28.

The cache tag memory 34 is electrically connected to the second address bus 28 and has a plurality of tag cells 38. Each tag cell 38 of the cache tag memory 34 is correspondent with one cache line 32 of the cache data memory 26 for storing a block address of data stored in the corresponding cache line 32 of the cache data memory 26.

When accessing the cache memory system 12, the processor 14 will transmit a data address 22 of data in the main memory 18 to the cache memory system 12 through the second address bus 28, the cache controller 36 will compare a block address of the data address 22 with a block address 39 stored in a corresponding tag cell 38. If the block address of the data address 22 and the block address 39 stored in the tag cell 38 have a cache hit, the cache controller 36 will write the data transmitted from the processor 14 through the second data bus 30 into a cache line 32 of the cache data memory 26 corresponding to the cache line address of the data address 22, or retrieve data stored in the cache line 32 to the processor 14 through the second data bus 30. If the block address of the data address 22 has a cache miss with the block address 39 stored in the tag cell 38, the cache controller 36 will initiate a swap procedure to replace the data stored in the cache line 32 of the cache data memory 26 corresponding to the cache line address of the data address 22 with the data stored in a storage cell 20 of the main memory 18 pointed by the data address 22, and replace the block address 39 stored in the tag cell 38 with the block address of the data address 22.

Whenever the block address of the data address 22 and the block address 39 stored in the tag cell 38 have a cache miss, the cache controller 36 will swap the data stored in the cache line 32 of the cache data memory 26, and swap the block address 39 stored in the corresponding tag cell 38 of the cache tag memory 34. If the processor 14 is to access rarely used data, the cache controller 36 will still initiate the swap procedure, resulting in a high penalty and a low hit rate.

SUMMARY OF THE INVENTION

It is therefore a primary objective of the present invention to provide a cache memory system of a computer to solve the above mentioned problem.

Briefly, in a preferred embodiment, the present invention provides a cache memory system of a computer which comprises a processor, an address bus electrically connected to the processor for transmitting a data address which can access one storage cell in the main memory, and a data bus electrically connected to the processor for transmitting data, the data address contained in the address bus comprising a low-order portion defined as a cache line address and a high-order portion defined as a block address, the cache memory system comprising:

a cache data memory, electrically connected between the address bus and the data bus, having a plurality of cache lines for storing data from the main memory, data stored in each cache line of the cache data memory being accessible by the processor using the cache line address contained in the address bus;

a first cache tag memory, electrically connected to the address bus, having a plurality of tag cells, each tag cell of the first cache tag memory being correspondent with one cache line of the cache data memory for storing a block address of data stored in the corresponding cache line of the cache data memory;

a second cache tag memory, electrically connected to the address bus, having a plurality of tag cells, each tag cell of the second cache tag memory being correspondent with one cache line of the cache data memory for storing a block address of the cache line of the cache data memory currently transmitted from the address bus; and a cache controller for controlling operations of the cache memory system;

wherein when accessing the cache memory system, the processor will transmit a data address of data in the main memory to the cache memory system through the address bus, a first block address stored in a tag cell of the first cache tag memory and a second block address stored in a tag cell of the second cache tag memory corresponding to a cache line address of the data address will be transmitted to the cache controller, and the cache controller will compare a block address of the data address with the first and second block addresses, if the block address of the data address and the first block address have a cache hit, the cache controller will write the data transmitted from the processor through the data bus into a cache line of the cache data memory corresponding to the cache line address of the data address, or retrieve data stored in the cache line to the processor through the data bus, if the block address of the data address has a cache miss with the first block address but has a cache hit with the second block address, the cache controller will initiate a swap procedure to replace the data stored in the cache line of the cache data memory corresponding to the cache line address of the data address with the data stored in a storage cell of the main memory pointed by the data address, if the block address of the data address has cache misses with both the first and second block addresses, the cache controller will control the processor to store the data into the main memory or retrieve the data from the main memory directly, but will not initiate the swap procedure to replace the data stored in the cache data memory, and the cache controller will store the block address of the data address into the tag cell of the second cache tag memory corresponding to the cache line address of the data address.

It is an advantage of the present invention that the cache memory system comprises dual cache tag memories. The data stored in the cache line of the cache data memory corresponding to the cache line address of the data address will be replaced with the data stored in the storage cell of the main memory pointed by the data address only if the processor accesses the data stored in the corresponding storage cell twice consecutively, reducing penalty and increasing hit rate.

These and other objects and the advantages of the present invention will no doubt become obvious to those of ordinary skill in the art after having read the following detailed description of the preferred embodiment that is illustrated in the various figures and drawings.

BRIEF DESCRIPTION OF THE DRAWINGS

FIG. 3 shows the relationship between block addresses of data being accessed and the swap procedure.

DETAILED DESCRIPTION OF THE PREFERRED EMBODIMENT

Figure 1:
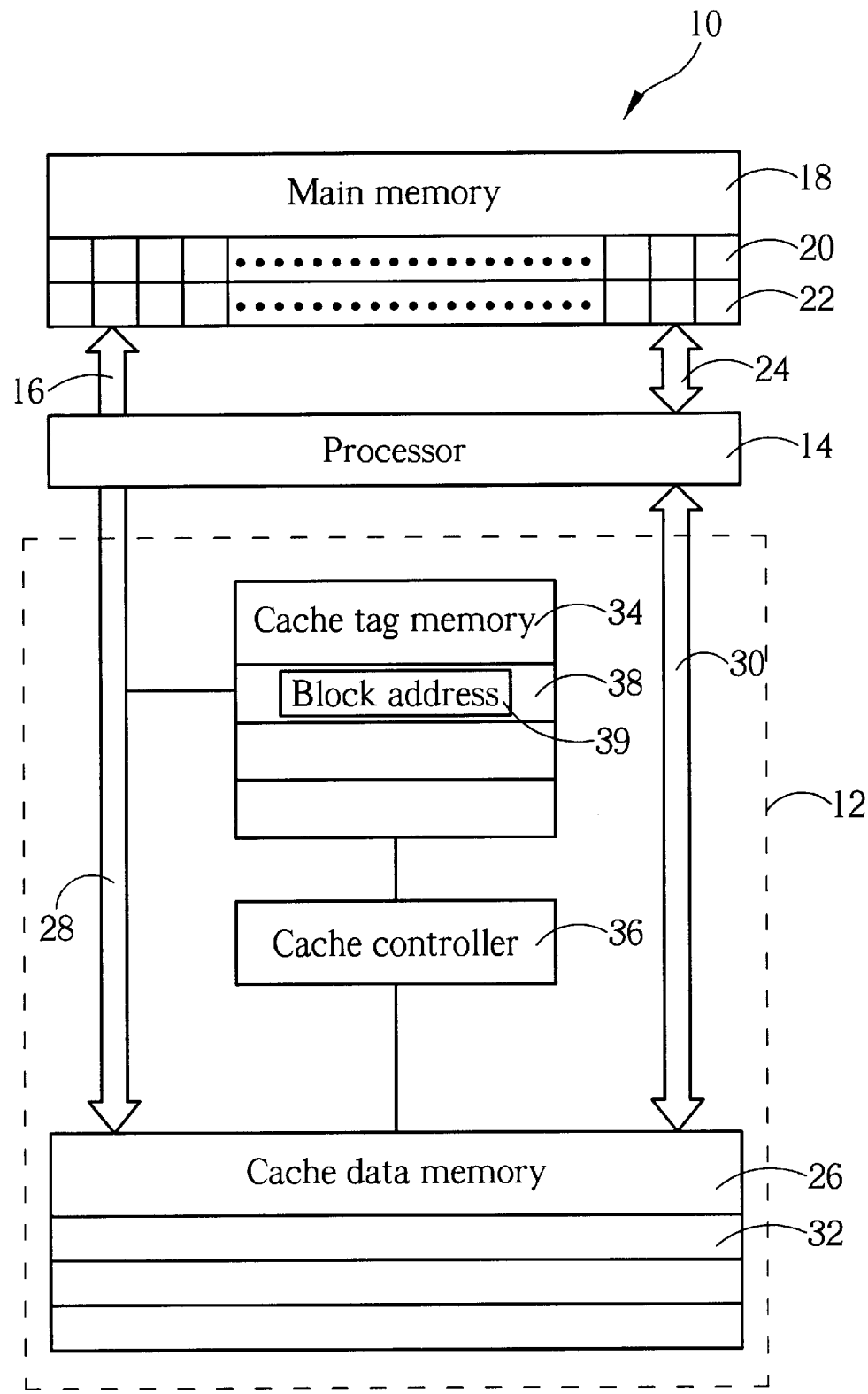
FIG. 1 is a functional block diagram of a prior art cache memory system of a computer.
Figure 2:
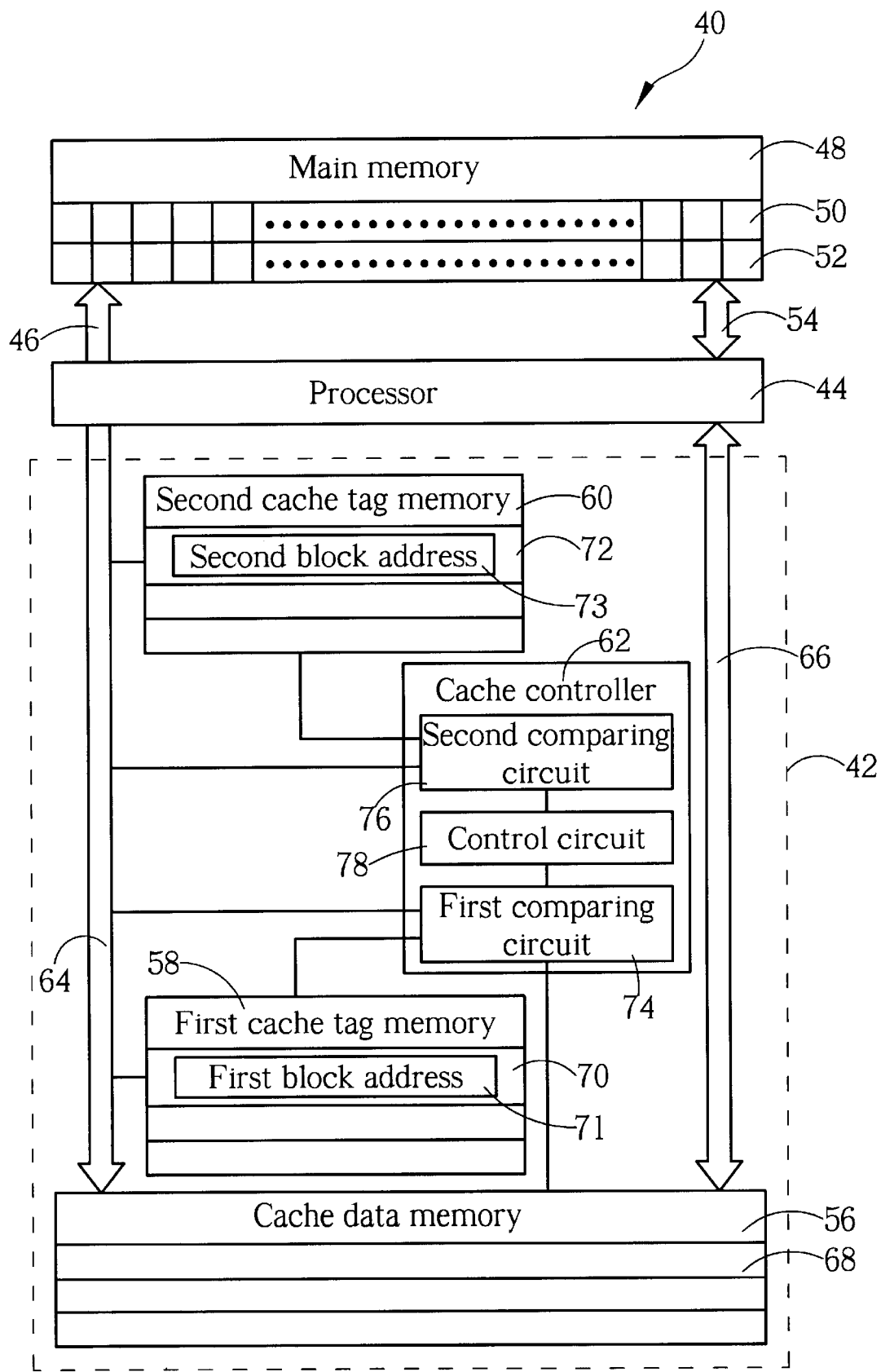
FIG. 2 is a functional block diagram of a cache memory system of a computer according to the present invention.

Please refer to FIG. 2. FIG. 2 is a functional block diagram of a cache memory system 42 of a computer 40 according to the present invention. The computer 40 comprises a processor 44, a first address bus 46 electrically connected between the processor 44 and the main memory 48 for transmitting a data address 52 which can access one storage cell 50 in the main memory 48, a first data bus 54 electrically connected between the processor 44 and the main memory 48 for transmitting data, a second address bus 64 electrically connected between the processor 44 and the cache data memory 56 for transmitting the data address 52, and a second data bus 66 electrically connected between the processor 44 and the cache data memory 56 for transmitting data. The data address 52 contained in the first and second address buses 46, 64 comprises a low-order portion defined as a cache line address and a high-order portion defined as a block address.

The cache memory system 42 comprises a cache data memory 56 electrically connected to the second address bus 64 and the second data bus 66, a first cache tag memory 58, a second cache tag memory 60 and a cache controller 62 for controlling operations of the cache memory system 42. The cache data memory 56 comprises a plurality of cache lines 68 for storing data from the main memory 48. Data stored in each cache line 68 of the cache data memory 56 is accessible by the processor 44 using the cache line address contained in the second address bus 64.

The first cache tag memory 58 is electrically connected to the second address bus 64 and has a plurality of tag cells 70. Each tag cell 70 of the first cache tag memory 58 is correspondent with one cache line 68 of the cache data memory 56 for storing a block address of data stored in the corresponding cache line 68 of the cache data memory 56.

The second cache tag memory 60 is electrically connected to the second address bus 64 and has a plurality of tag cells 72. Each tag cell 72 of the second cache tag memory 60 is correspondent with one cache line 68 of the cache data memory 56 for storing a block address of the cache line 68 of the cache data memory 56 currently transmitted from the second address bus 64.

The cache controller 62 comprises a first comparing circuit 74, a second comparing circuit 76, and a control circuit 78 electrically connected to the first and second comparing circuits 74, 76 for controlling operations of the cache controller 62. The first comparing circuit 74 is electrically connected to the first cache tag memory 58 and the second address bus 64 for comparing whether the block address of the data address 52 transmitted from the second address bus 64 and a first block address 71 transmitted from the first cache tag memory 58 have a cache hit. The second comparing circuit 76 is electrically connected to the second cache tag memory 60 and the second address bus 64 for comparing whether the block address of the data address 52 transmitted from the second address bus 64 and a second block address 73 transmitted from the second cache tag memory 60 have a cache hit.

When accessing the cache memory system 42, the processor 44 will transmit a data address 52 of data in the main memory 48 to the cache memory system 42 through the second address bus 64. The first block address 71 stored in a tag cell 70 of the first cache tag memory 58 and the second block address 73 stored in a tag cell 72 of the second cache tag memory 60 corresponding to a cache line address of the data address 52 will be transmitted to the cache controller 62. The cache controller 62 will compare a block address of the data address 52 with the first and second block addresses 71, 73 separately.

If the first comparing circuit 74 shows that the block address of the data address 52 and the first block address 71 have a cache hit, the control circuit 78 will write the data transmitted from the processor 44 through the second data bus 66 into the cache line 68 of the cache data memory 56 corresponding to the cache line address of the data address 52, or retrieve the data stored in the cache line 68 to the processor 44 through the second data bus 66. If the first comparing circuit 74 shows that the block address of the data address 52 has a cache miss with the first block address 71 but the second comparing circuit 76 shows that the block address of the data address 52 has a cache hit with the second block address 73, the control circuit 78 will initiate a swap procedure to replace the data stored in the cache line 68 of the cache data memory 56 corresponding to the cache line address of the data address 52 with the data stored in the storage cell 50 of the main memory 48 pointed by the data address 52. If the first and second comparing circuits 74, 76 show that the block address of the data address 52 has cache misses with both the first and second block addresses 71, 73, the control circuit 78 will control the processor 44 to store the data into the main memory 48 or retrieve the data from the main memory 48 directly, will not initiate the swap procedure to replace the data stored in the cache data memory 56, and will store the block address of the data address into the tag cell 72 of the second cache tag memory 60 corresponding to the cache line address of the data address 52.

Please refer to FIG. 3. FIG. 3 shows the relationship between block addresses of data being accessed and the swap procedure. As shown in FIG. 3, the second block address 73 in the corresponding tag cell 72 of the second cache tag memory 60 consistently changes with the block address of data being accessed by the processor 44. When the block address of data is consecutively accessed twice, the first block address 71 in the corresponding tag cell 70 of the first cache tag memory 58 will be replaced, and the control circuit 78 will initiate the swap procedure to swap the data stored in the cache data memory 56.

Compared with the prior art cache memory system 12, the cache memory system 42 comprises dual cache tag memories 58, 60. When the block address of data is consecutively accessed twice, the control circuit 78 will initiate the swap procedure to swap the data stored in the cache data memory 56. If the processor 44 accesses rarely used data only once, the control circuit 78 will not initiate the swap procedure, increasing hit rate and reducing penalty.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cache memory system of a computer which comprises a processor, an address bus electrically connected to the processor for transmitting a data address which can access one storage cell in the main memory, and a data bus electrically connected to the processor for transmitting data, the data address contained in the address bus comprising a low-order portion defined as a cache line address and a high-order portion defined as a block address, the cache memory system comprising:

a cache data memory, electrically connected between the address bus and the data bus, having a plurality of cache lines for storing data from the main memory, data stored in each cache line of the cache data memory being accessible by the processor using the cache line address contained in the address bus;

a first cache tag memory, electrically connected to the address bus, having a plurality of tag cells, each tag cell of the first cache tag memory being correspondent with one cache line of the cache data memory for storing a block address of data stored in the corresponding cache line of the cache data memory;

a second cache tag memory, electrically connected to the address bus, having a plurality of tag cells, each tag cell of the second cache tag memory being correspondent with one cache line of the cache data memory for storing a block address of the cache line of the cache data memory currently transmitted from the address bus; and a cache controller for controlling operations of the cache memory system;

wherein when accessing the cache memory system, the processor will transmit a data address of data in the main memory to the cache memory system through the address bus, a first block address stored in a tag cell of the first cache tag memory and a second block address stored in a tag cell of the second cache tag memory corresponding to a cache line address of the data address will be transmitted to the cache controller, and the cache controller will compare a block address of the data address with the first and second block addresses separately, if the block address of the data address and the first block address have a cache hit, the cache controller will write the data transmitted from the processor through the data bus into a cache line of the cache data memory corresponding to the cache line address of the data address, or retrieve data stored in the cache line to the processor through the data bus, if the block address of the data address has a cache miss with the first block address but has a cache hit with the second block address, the cache controller will initiate a swap procedure to replace the data stored in the cache line of the cache data memory corresponding to the cache line address of the data address with the data stored in a storage cell of the main memory pointed by the data address, if the block address of the data address has cache misses with both the first and second block addresses, the cache controller will control the processor to store the data into the main memory or retrieve the data from the main memory directly, will not initiate the swap procedure to replace the data stored in the cache data memory, and will store the block address of the data address into the tag cell of the second cache tag memory corresponding to the cache line address of the data address.

2. The cache memory system of claim 1 wherein the cache controller comprises:

a first comparing circuit electrically connected to the first cache tag memory and the address bus for comparing whether the block address of the data address transmitted from the address bus and the first block address transmitted from the first cache tag memory have a cache hit;

a second comparing circuit electrically connected to the second cache tag memory and the address bus for comparing whether the block address of the data address transmitted from the address bus and the second block address transmitted from the second cache tag memory have a cache hit; and a control circuit electrically connected to the first and second comparing circuits for controlling operations of the cache controller;

wherein if the first comparing circuit shows that the block address of the data address and the first block address have a cache hit, the control circuit will write the data transmitted from the processor through the data bus into the cache line of the cache data memory corresponding to the cache line address of the data address, or retrieve the data stored in the cache line to the processor through the data bus, if the first comparing circuit shows that the block address of the data address has a cache miss with the first block address but the second comparing circuit shows that the block address of the data address has a cache hit with the second block address, the control circuit will initiate the swap procedure to replace the data stored in the cache line of the cache data memory corresponding to the cache line address of the data address with the data stored in the storage cell of the main memory pointed by the data address, if the first and second comparing circuits show that the block address of the data address has cache misses with both the first and second block addresses, the control circuit will control the processor to store the data into the main memory or retrieve the data from the main memory directly, will not initiate the swap procedure to replace the data stored in the cache data memory, and will store the block address of the data address into the tag cell of the second cache tag memory corresponding to the cache line address of the data address.

3. The cache memory system of claim 1 wherein the data bus and the address bus between the processor and the cache memory system are a second data bus and a second address bus, and the computer further comprises a first data bus and a first address bus between the processor and the main memory for transmitting data and data addresses.

* * * * *